(12) United States Patent
Li et al.

(10) Patent No.: US 11,343,738 B2
(45) Date of Patent: May 24, 2022

(54) HANDOVER-BASED CONNECTION RESUME TECHNIQUE

(71) Applicant: ZTE Corporation, Guangdong (CN)

(72) Inventors: Wenting Li, Guangdong (CN); He Huang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 65 days.

(21) Appl. No.: 16/876,045

(22) Filed: May 16, 2020

(65) Prior Publication Data
US 2020/0351740 A1   Nov. 5, 2020

Related U.S. Application Data

(63) Continuation of application No. PCT/CN2017/111734, filed on Nov. 17, 2017.

(51) Int. Cl.
*H04W 4/00* (2018.01)
*H04W 36/08* (2009.01)
*H04W 76/19* (2018.01)
*H04W 76/11* (2018.01)
*H04W 36/00* (2009.01)
*H04W 36/24* (2009.01)

(52) U.S. Cl.
CPC ....... *H04W 36/08* (2013.01); *H04W 36/0033* (2013.01); *H04W 36/00837* (2018.08); *H04W 36/24* (2013.01); *H04W 76/11* (2018.02); *H04W 76/19* (2018.02)

(58) Field of Classification Search
CPC ..... H04W 36/08; H04W 76/19; H04W 76/11; H04W 36/00837; H04W 36/0033; H04W 36/24; H04W 40/36

USPC .......................................... 370/331; 455/436
See application file for complete search history.

(56) References Cited

U.S. PATENT DOCUMENTS

| | | | | |
|---|---|---|---|---|
| 2008/0267127 | A1* | 10/2008 | Narasimha | H04W 36/0072 370/331 |
| 2014/0369206 | A1 | 12/2014 | Karlsson et al. | |
| 2015/0098448 | A1* | 4/2015 | Xu | H04W 36/0079 370/331 |
| 2015/0365860 | A1* | 12/2015 | Yu | H04W 36/22 455/444 |

(Continued)

FOREIGN PATENT DOCUMENTS

| CN | 101848536 A | 9/2010 |
|---|---|---|
| CN | 102811467 A | 12/2012 |

(Continued)

OTHER PUBLICATIONS

International Search Report and Written Opinion dated Aug. 1, 2018 for International Application No. PCT/CN2017/111734, filed on Nov. 17, 2017 (8 pages).

(Continued)

*Primary Examiner* — Marcos Batista
(74) *Attorney, Agent, or Firm* — Perkins Coie LLP

(57) ABSTRACT

A wireless communication technique includes sending, from a target wireless node to a source wireless node, a message to start a handover process, wherein the message includes an identification of a wireless device and an indication field, and transmitting, upon receiving a handover request during the handover process, a message to the wireless device to resume reconnection.

24 Claims, 10 Drawing Sheets

(56) References Cited

U.S. PATENT DOCUMENTS

2016/0142951 A1* 5/2016 Balasubramanian ........................
                                                              H04W 36/023
                                                                   370/331
2019/0246330 A1* 8/2019 Gao ...................... H04W 68/02
2020/0267800 A1* 8/2020 Kim ..................... H04W 76/38

FOREIGN PATENT DOCUMENTS

| CN | 103841608 A | 6/2014 |
| CN | 107135549 A | 9/2017 |
| WO | 2011144137 A1 | 11/2011 |

OTHER PUBLICATIONS

LG Electronics Inc., "Discussion for intra-system mobility in inactive mode," 3GPP TSG-RAN WG3 Meeting #NR Ad-hoc, Spokane, Washington, USA, R3-170079, 3 pages, Jan. 2017.
Office Action for Chinese Patent Application No. 201780096710.0, dated Aug. 19, 2021 (13 pages).
Qualcomm Inc., "UE mobility while in RRC inactive mode—SA2 aspects," SA WG2 Meeting #119, Dubrovnik, Croatia, S2-170917, Feb. 2017, 8 pages.
Huawei et al., "Inter-RAT mobility for inactive UE," 3GPP TSG-RAN WG2 Meeting #99, Berlin, Germany, R2-1708713, Aug. 2017, 4 pages.
Office Action for Chinese Patent Application No. 201780096710.0, dated Jan. 19, 2022 (14 pages).

* cited by examiner

HANDOVER-BASED CONNECTION RESUME TECHNIQUE

CROSS REFERENCE TO RELATED APPLICATIONS

This patent document is a continuation of and claims benefit of priority to International Patent Application No. PCT/CN2017/111734, filed on Nov. 17, 2017. The entire content of the before-mentioned patent application is incorporated by reference as part of the disclosure of this application.

TECHNICAL FIELD

This document relates to systems, devices and techniques for wireless communications.

BACKGROUND

Efforts are currently underway to define next generation wireless communication networks that provide greater deployment flexibility, support for a multitude of devices and services and different technologies for efficient bandwidth utilization. The next generation wireless communication networks are also expected to deploy new core networks that provide additional services and flexibility beyond currently available core networks.

SUMMARY

This document describes technologies that can be used to facilitate resumption of connection of a user device while moving between a source radio access network area to a target radio access network area, while in inactive mode.

In one example aspect, a method of wireless communication is disclosed. The method includes sending, from a target wireless node to a source wireless node, a message to start a handover process, wherein the message includes an identification of a wireless device and an indication field, and transmitting, upon receiving a handover request during the handover process, a message to the wireless device to resume reconnection.

In another example aspect, another method of wireless communication is disclosed. The method includes receiving, at a source wireless node, a context retrieval request including an indication from a target wireless node, and triggering, in response to the indication, a handover process.

In yet another example aspect, a wireless communications apparatus comprising a processor is disclosed. The processor is configured to implement methods described herein.

In another example aspect, the various techniques described herein may be embodied as processor-executable code and stored on a computer-readable program medium.

The details of one or more implementations are set forth in the accompanying drawings, and the description below. Other features will be apparent from the description and drawings, and from the claims.

BRIEF DESCRIPTION OF THE DRAWINGS

Like reference symbols in the various drawings indicate like elements.

DETAILED DESCRIPTION

The Inactive state has recently been introduced in 5G standardization activity. In the Inactive state, if the terminal (e.g., a user equipment, or a mobile phone, or another user device capable of wireless communication) moves to the boundary of the TAList (tracking area list), the terminal crosses the radio access network (RAN) area and across the CN (core network) area. In many implementations, the terminal executes the TAU (tracking area update) process at this time. However, if in this case, the new CN area cannot be connected to the original AMF (Access and Mobility Management Function), and the new AMF does not have a terminal context. Therefore, even if the AS (application stratum) can resume successfully, the NAS (non-access stratum) context is not synchronized.

First, the concept of inactivity state in 5G is discussed briefly. Then the concept of RAN Area newly introduced in 5G. The present document also provides additional disclosure about various scenarios in which RAN Area and core network area are overlapped.

In the inactive state, the terminal and the network side maintain the terminal context. When there is subsequent data or message to be sent, the terminal may directly send an RRCConnectionresumeRequest message. Then, the network side transmits the RRCConnectionResume message according to the identity of the terminal in a RRCConnectionresumeRequest message, The base station obtains the terminal context and directly restores the connection of the terminal according to the terminal context. During the resume procedure, the security is activated, meanwhile both the SRB and DRBs are resumed.

In the inactive state, if there is downlink data or downlink messages to be sent, the network may initiate the paging process first. Similarly, in order to reduce the delay, a paging of a RAN Area is defined in 5G. The paging period of the RAN Area is typically smaller than the paging period of the core network area. As agreed in the 3GPP #97 meeting "A UE in INACTIVE is reachable via RAN-initiated notification and CN-initiated Paging. RAN and CN paging occasions overlap and same paging/notification mechanism used." In addition, in order to reduce the paging load of the entire system, the RAN Area is typically smaller than or equal to the core network registered area. Also, because in the inactive state, the network will only initiate RAN Area paging (because the inactive state is equivalent to the connected state for the NAS layer, so no paging in the connected state is initiated).

For a terminal that moves while in the inactive state, when moving from one RAN Area to another RAN Area, the terminal should report to the network through a RAN Area update procedure, but by this procedure the network can get the latest UE location.

Figure 1:
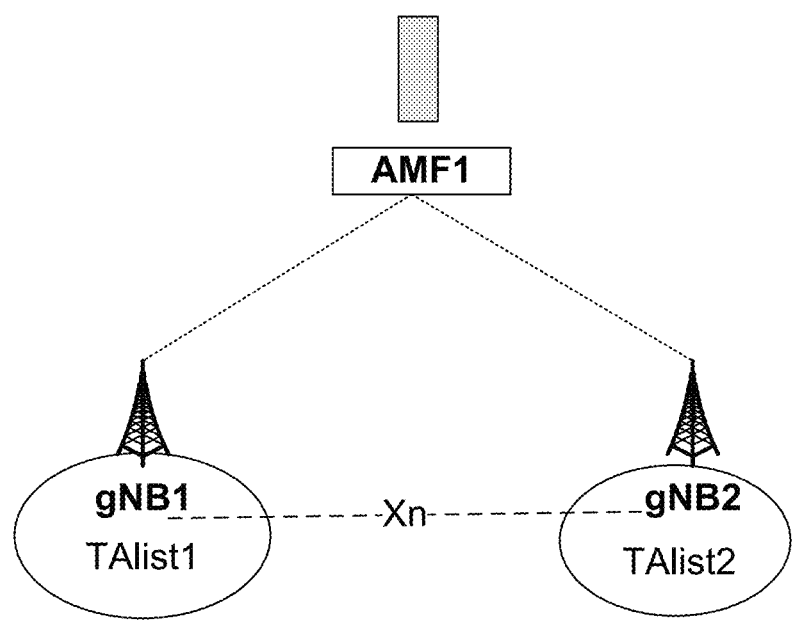
FIG. 1 shows an example of wireless network in which intra-access and mobility function (AMF) tracking area update (TAU).
Figure 2:
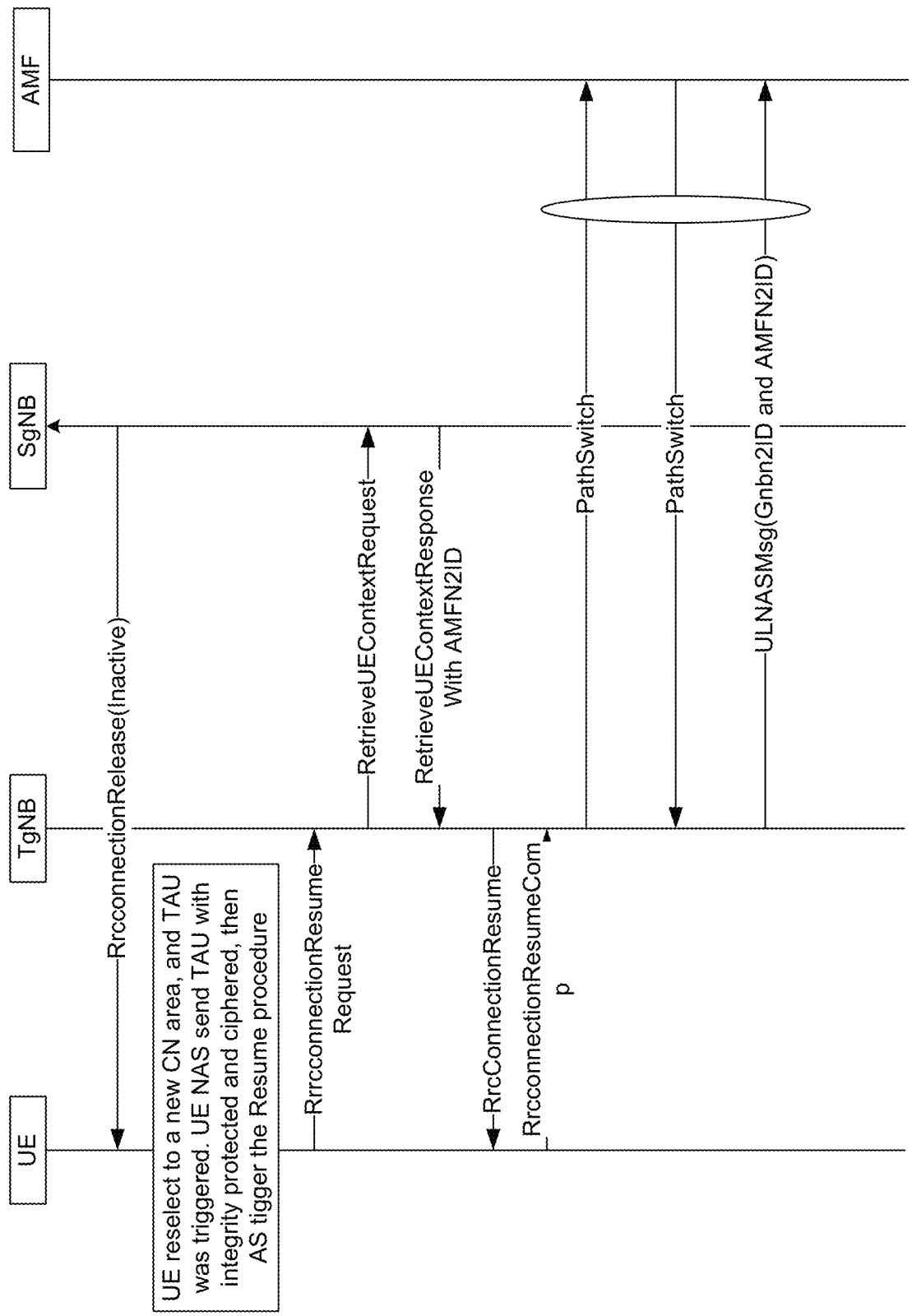
FIG. 2 shows an example of messages exchanged when a wireless terminal moves without changing AMF.

As described above, when the terminal moves to a new RAN Area in an inactive state, a RAN Area update procedure is to be initiated. However, one problem is that when the terminal moves to a new RAN Area and the RAN Area belongs to a new core network area, it is not clear how the terminal should operate. According to the rules of the core network area, the terminal should initiate the TAU process. In this way, there is a process that RAN Area updates overlap with core network area updates. The UE NAS layer will trigger a TAU procedure by sending a TAU msg to the UE AS layer, then the UE AS layer will trigger a RRCConnection resume procedure for that it's at Inactive state. If the target cell can be connected to the original AMF at this time, the target cell will select the original AMF to continue service. The above described procedure is described as in FIG. 2, which depicts an example of the above scenario in which the terminal moves from gNB1 (source gNB) to gNB2 (target gNB) without AMF change. The terms gNB may refer to base stations (or node Bs) in the newer protocol version of the wireless protocol such as the upcoming 5G standard, while the term eNB may refer to the current (or legacy) node Bs, such as those defined in the Long Term Evolution (LTE) standard.

Figure 3:
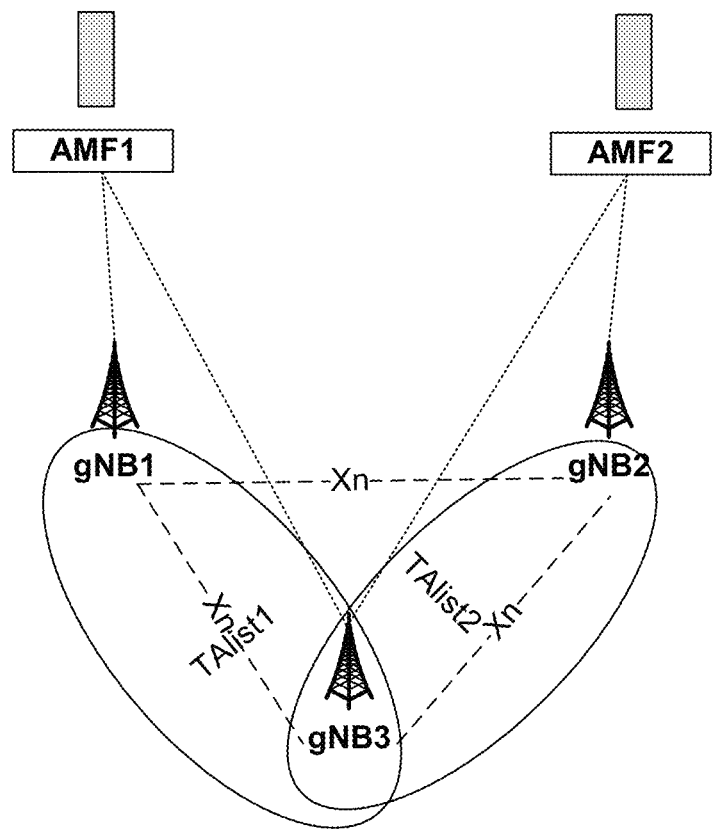
FIG. 3 shows an example of a wireless network in which an inter-AMF TAU is performed.

FIG. 3 depicts a scenario in which different AMFs may be communicatively connected to different gNBs. gNB1 is connected to AMF1. gNB3 is connected to both AMF1 and AMF2 and gNB2 is connected to AMF2. If a terminal selects AMF1 when registering gNB3 and then moves to gNB2, then N2 port is not established between gNB2 and AMF1. In this case, the terminal sends a TAU request through Resume in gNB2. Although AS may resume Successful, the NAS context is not synchronized, resulting in the NAS layer and AS layer configuration mismatch.

Figure 4:
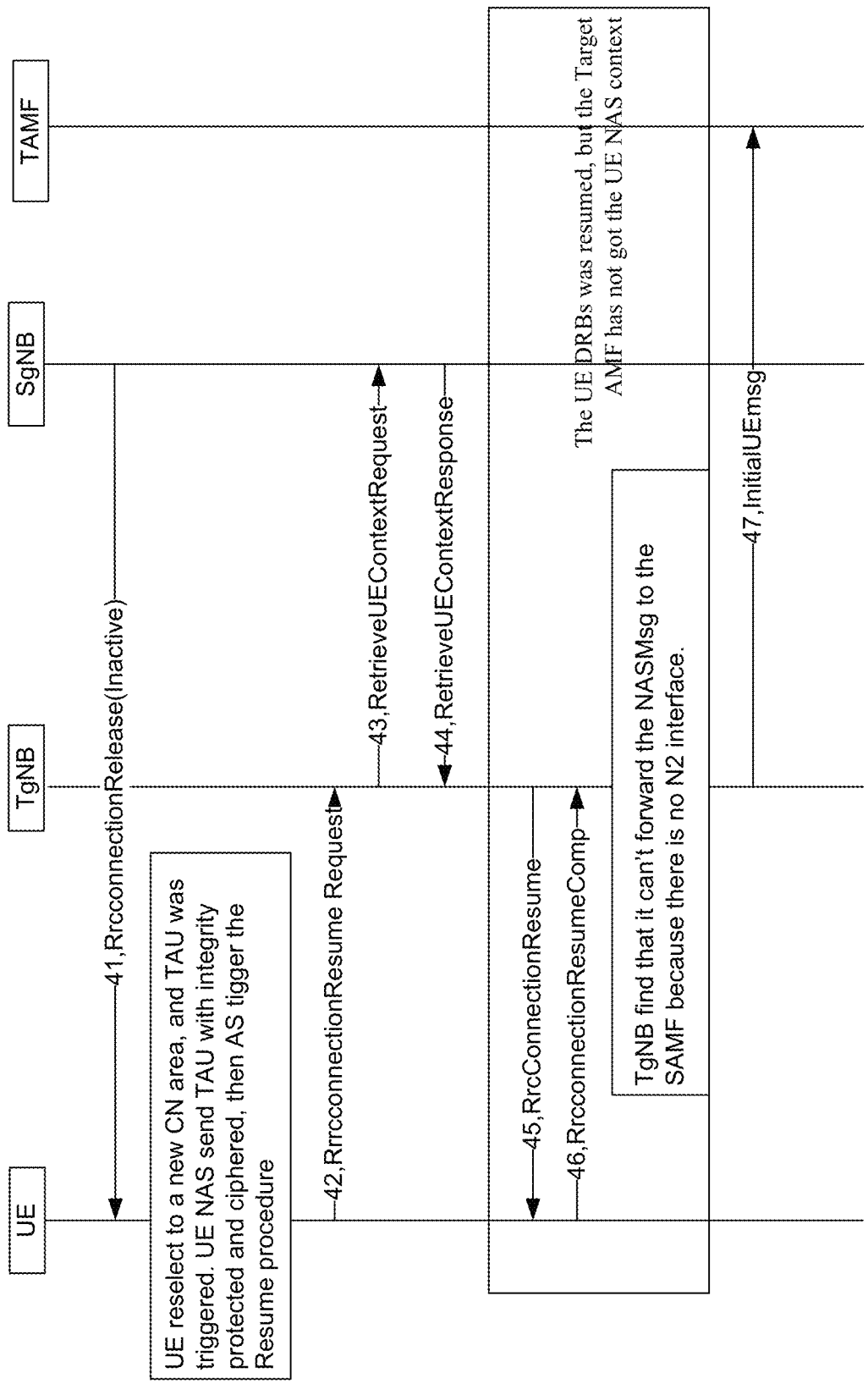
FIG. 4 shows an example of messages exchanged when a terminal moves but there is no context of the terminal on the new AMF.

As shown in FIG. 4, messages exchanged among a terminal (UE), the target gNB, the source gNB and the target AMF (TAMF) are depicted. Here, on the new AMF, there is no context of the terminal. However, the DRB configuration of the AS is already configured. In this case, if there is uplink data reaching a new gNB, the new gNB (target gNB) will not be able to send data Send to the network side. It is required that NAS session synchronization must be synchronized when AS DRB is restored. In FIG. 4, the messages exchanged include:

41: source gNB sends RRCconnectionRelease message to the terminal going to inactive state.

The terminal moves to new CN area, and TAU is triggered. UE NAS sends TAU with integrity protected. AS triggers RRCConnection Resume procedure.

42: Terminal sends RrcconnectionResumerequest to the target gNB.

43: target gNB attempts to retrieve UE context of the terminal from the source gNB.

44: Source gNB provides a retrieve UE context response to the target gNB.

45: target gNB indicates to the terminal to resume RRC connection.

46: the terminal confirms that RRC connection resume was completed.

At some point in future, target gNB finds out that it cannot forward NAS message to the source AMF because there is no N2 interface established.

47: target gNB requests initial UE message for the terminal to the target AMF.

Figure 5:
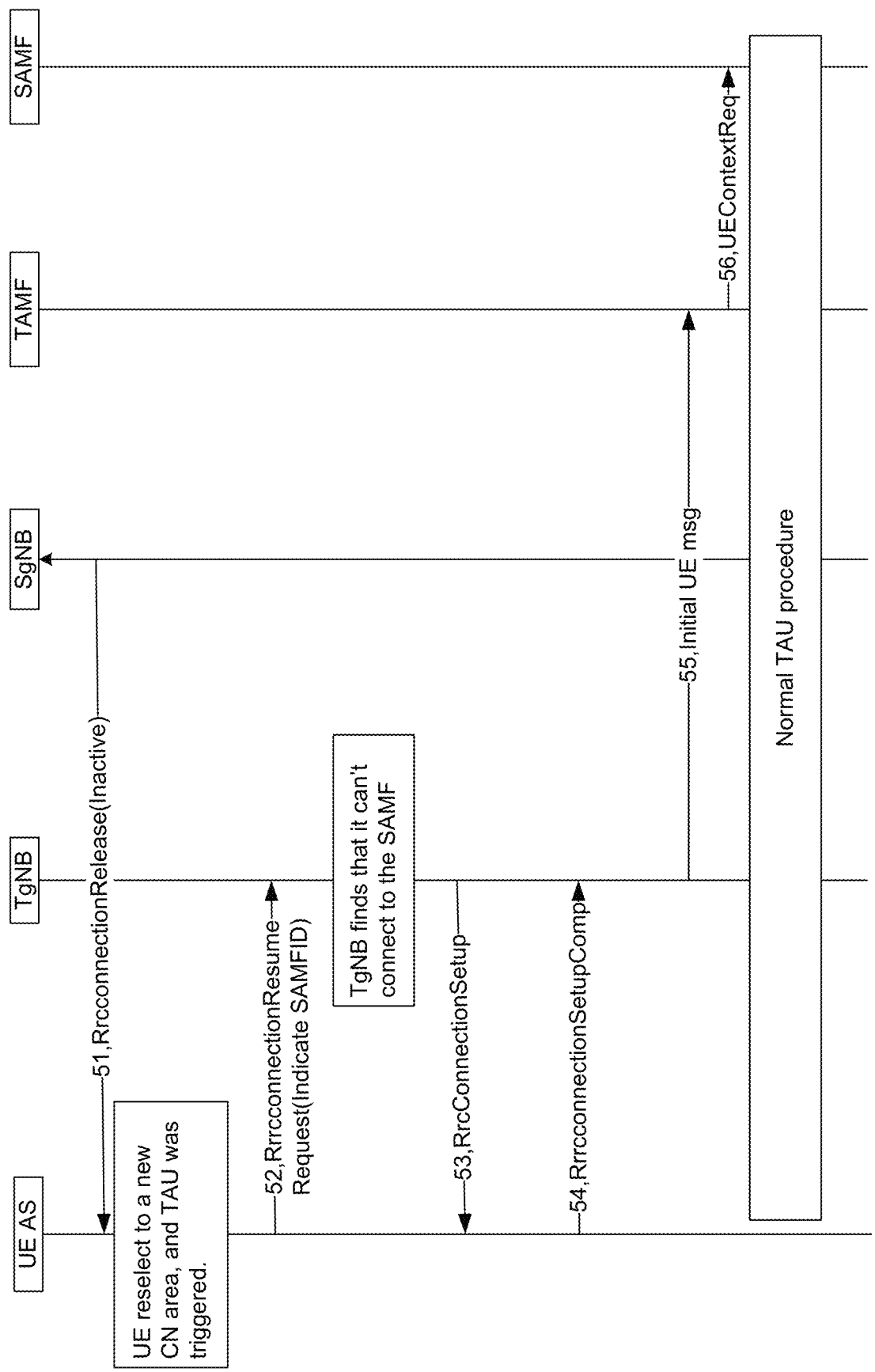
FIG. 5 is an example of messages exchanged in a core network update procedure in which AMF is changed.

If the directly established method in FIG. 5 is used for such a process, the security procedure needs to be further performed after the RRC connection is established, and then the corresponding DRBs is reconfigured. This greatly increases the recovery delay of user data and the NAS Execution delay of the TAU procedure. The techniques disclosed herein can be used by embodiments that provide a handover-based connection recovery method for reducing connection recovery delay with CN node change.

The present document is applicable to all wireless connection recovery scenarios in the field of wireless communications. The present document provides a handover-based connection recovery method that can be used by embodiments to reduce the delay of wireless connection recovery with CN node change.

Embodiment 1-1: Intra-System Handover Based Recovery Process

Figure 6:
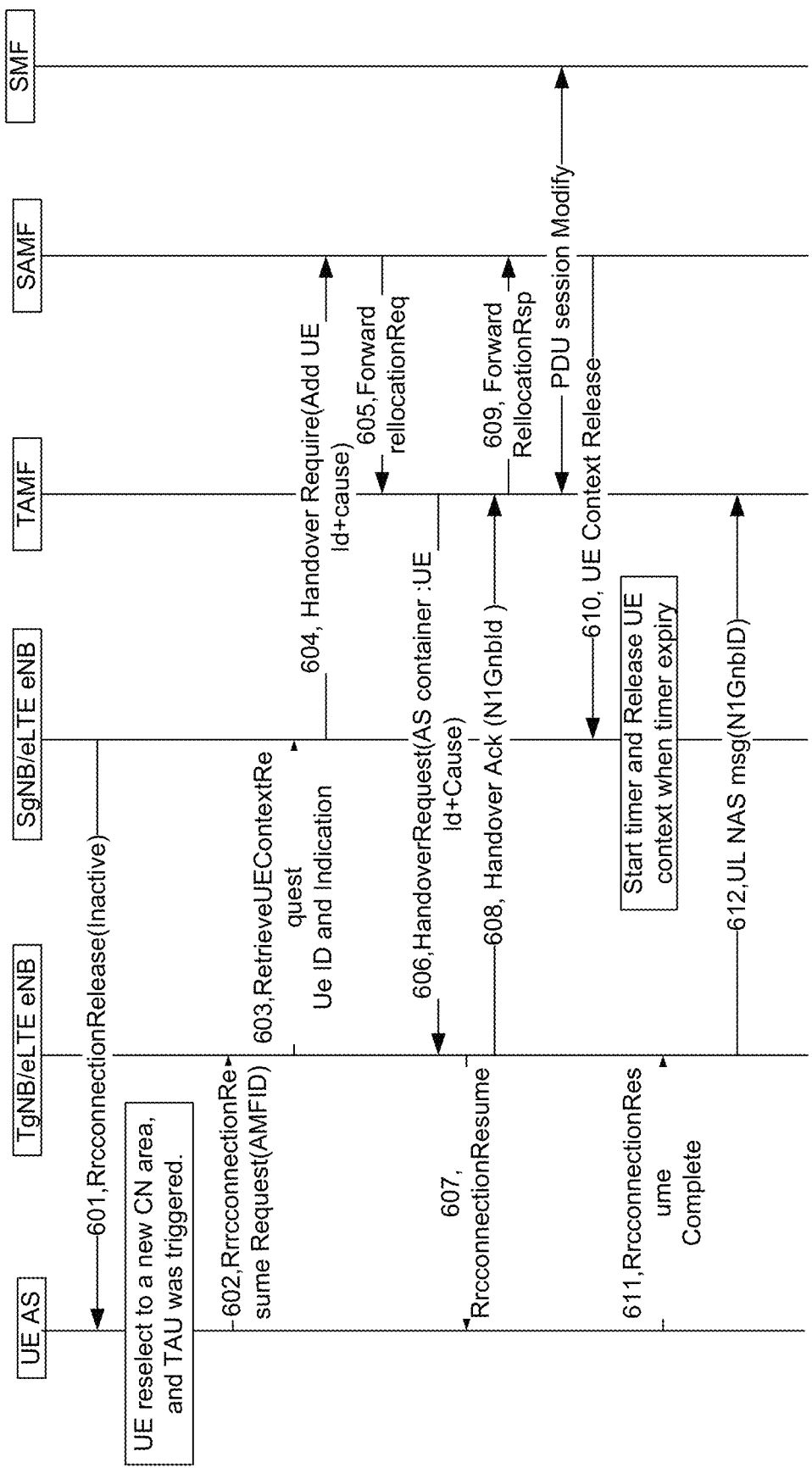
FIG. 6 is an example of messages exchanged in a procedure of handover between two wireless nodes.

With reference to FIG. 6, the following procedure may include a handover process as described below. In FIG. 6, message exchanges between the following network elements are shows: UE AS (e.g., application stratum of a terminal), TgNB or eLTE eNB (target base station, or new AS node), SgNB (source base station or source AS node), TAMF (AMF in the target RAN Area), SAMF (AMF in the source RAN Area), SMF (session management function).

Step 1101: The terminal receives an RRCConnectionRelease message 601 (or other message indicating entering an inactive state) under the source AS node to indicate that the inactive state is entered.

Step 1102: The terminal moves to a new registration area, and the terminal initiates a registration area update process, and at this moment, the terminal NAS layer indicates the identifier of the AS layer source core network node. The terminal initiates a recovery request message 602 on a new AS node (target gNB), where the recovery request message carries the identifier of the source core network node.

Step 1103: The target gNB node discovers that it cannot connect to the source core network node indicated by the terminal, sends a terminal context acquisition message 603 to the source AS node (source gNB), and instructs the source AS node to make a handover. The message carries both terminal ID information and new AS node information.

Step 1104: After receiving a new AS node message, the source AS node triggers a handover require message 604 to the source core network node, source AMF, where the message carries the terminal ID information, the specific cause value, and the new AS node information.

Step 1105: The source core network node SAMF routes the new core network node according to the new AS node identification, and sends the forward relocation request 605 to the new core network node (target AMF).

Step 1106: The new core network node sends a message of handover request 606 to the new AS node (target gNB) after receiving the forward relocation request, and carries the configuration information of the AS, the information of the PDU session, and the terminal ID information in the handover request message, as well as specific reason values.

Step 1107: After receiving the handover request message from the new core network node, the new AS node matches the terminal that originated the recovery request according to the terminal ID information carried in the message, and sends a recovery message 607 to the terminal.

Step 1108: The new AS node sends a handover ACK message 608 to the new core network node.

Step 1109: The new core network node sends a forward reallocation response 609 to the source core network node. After this, a PDU session modify process may occur between the new core network node and the SMF.

Step 1110: The source core node sends a release terminal context message 610 to the source AS node, and the AS may start a clock at this time, and delete the context after the clock expires.

Step 1111: At some time in future, the terminal sends a recovery success message 611 to the new AS node.

Step 1112: The new AS node sends the NAS message carried by the terminal to the new core network node through an uplink direct transfer message 612.

Example Embodiment 1-2: Intra-System Handover Based Recovery Process

Figure 7:
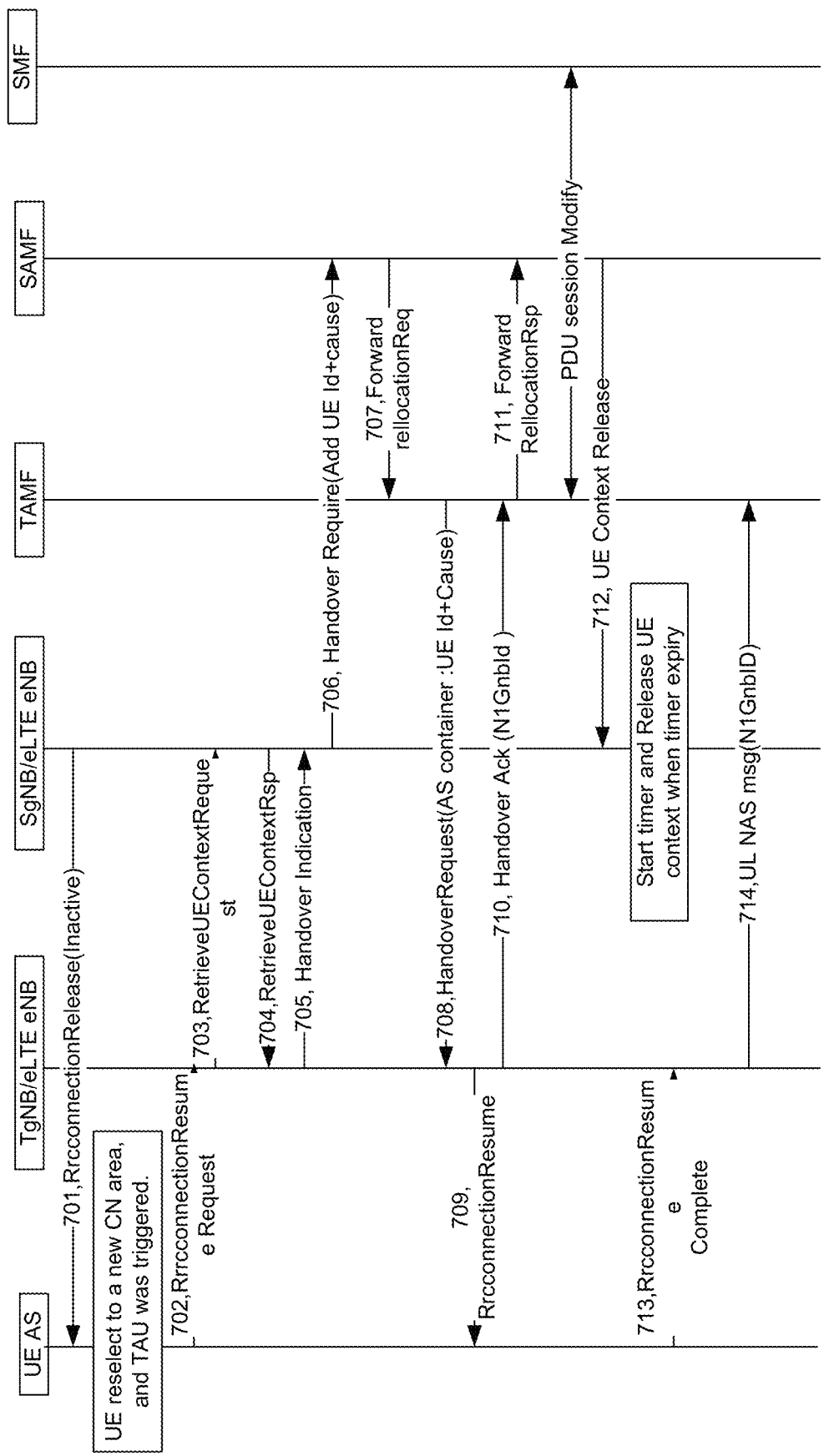
FIG. 7 is an example of messages exchanged in a procedure of handover between two different systems.

With reference to FIG. 7, messages exchanged in a handover procedure between two different systems is described. The messages are exchanged among different network entities as described with respect to FIG. 6.

Step 1201: The terminal receives an RRCConnectionRelease message 701 (or other message indicating entering an inactive state) under the source AS node to indicate that the inactive state is entered.

Step 1202: The terminal moves to a new registration area, and the terminal initiates a registration area update process. The terminal initiates a recovery request message 702 on a new AS node, where the recovery request message carries the identifier of the source core network node.

Step 1203: The new AS node source node requests the terminal context information 703.

Step 1204: The source AS node replies the terminal context information 704 to the new node.

Step 1205: The new AS node discovers that it cannot connect to the source core network, instructing 705 the source AS node to trigger the handover process.

Steps 1206 to 1214, and the corresponding messages 606 to 614, are substantially similar to steps 1104 to 1112 described with respect to FIG. 6.

Example Embodiment 2-1: Inter-System Handover-Based Recovery Process

Figure 8:
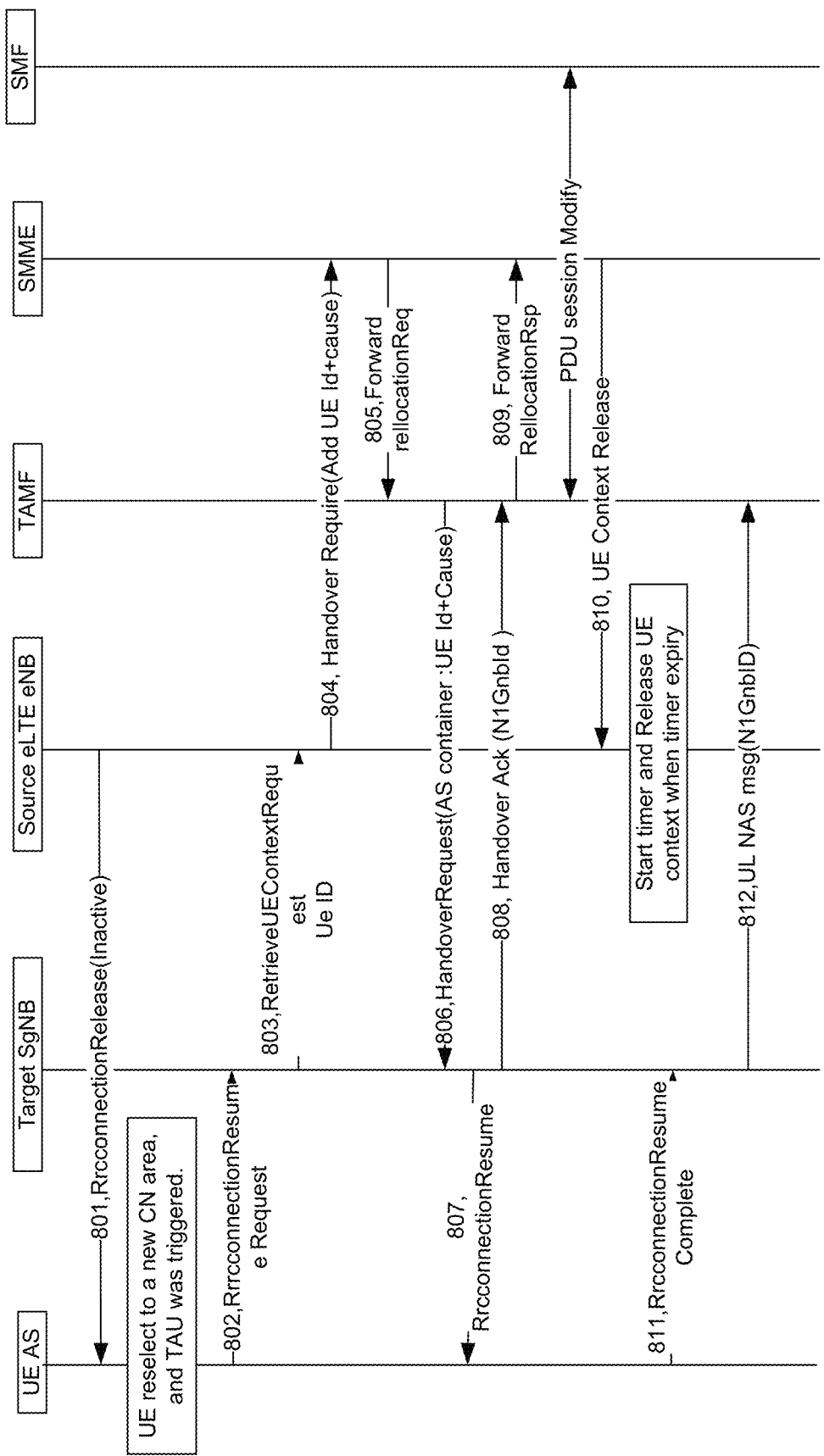
FIG. 8 shows an example of messages exchanged during an inter-system handover based recovery process.

With reference to FIG. 8, messages exchanged among different network elements are disclosed. The network elements are similar to those described with respect to FIG. 6, with the difference that, since the source area in this case is LTE (legacy to 5G standard), the mobility management is performed by a source Mobility management entity (SMME), instead of the SMF in the case of FIG. 6 and FIG. 7.

Step 2101: The terminal receives an RRCConnectionRelease message 801 (or other message indicating that the UE enters an inactive state) under the source AS node to indicate that the UE enters an inactive state.

Step 2102: The terminal moves to a new RAN Area, and the terminal initiates a registration area update process. The terminal initiates a resume request message 802 on the new AS node.

Step 2103: The new AS node sends a terminal context acquisition message 803 to the source AS node.

Step 2104: After receiving the new AS node message, the source AS node finds that the terminal needs to change the system, and then triggers a handover require message 804 to the source core network node, where the message may carry ID information of the terminal, a specific cause value, and New AS node information.

Steps 2105 to 2112, and the corresponding messages 805 to 812 are the same as steps 1105 to 1112, and the corresponding messages 605 to 612.

It will be appreciated that the present invention is applicable to all wireless connection recovery scenarios in the field of wireless communications. The present invention provides a handover-based connection recovery method to reduce the delay of wireless connection recovery across the core network.

Accordingly, in some embodiments, the target wireless node (e.g., target gNB) notifies the source wireless node (e.g., source gNB) to trigger the handover process.

After receiving the handover indication, the new wireless node sends a resume message to the terminal.

Examples of Trigger Conditions

After the target wireless node obtains the information of the source core network elements, the target wireless node determines whether the terminal can connect to the source core network.

Further, if the source core network element cannot be connected, the source wireless node is notified.

The method for obtaining the source core network element includes: (1) Obtaining from the terminal's Resume Request message. (2) Obtaining the terminal context from the source wireless node.

Examples of Notifications

In some embodiments, the target wireless node notifies the source wireless node to trigger a handover process. This notification mode may be that the target wireless node sends a first message to the source wireless node, which is used by the target wireless node to inform the source wireless node that the target wireless node cannot connect to an old core network node (e.g., AMF).

Specifically, the first message carries the identity information of the UE for identifying the UE. The message may also carry indication information of the scenario, and the radio node used for initiating the handover process. The indication information for the scenario may be a new cell or may be a new reason value.

The first message can use reserved bits or format of an existing message, or a message with a new format.

In some embodiments, the triggered switching process may be used to synchronize information stored in the source wireless node to the target wireless node.

Specifically, the information available to the source wireless node about the terminal is sent to the target wireless node and the information of the source core network node is synchronized to the target core network node.

After the source wireless node receives the first message of the new wireless node, it sends out a second message.

The second message is between a wireless node and a core network node, where the second message includes access layer context information about the terminal on the source wireless node, identity information of the terminal, and identification information of a new wireless node. The second message may be implemented by using an existing message, for example, a HandoverRequest message, where the message includes an identity message of the terminal and indication information for the scenario.

Optionally, the source core network may also determine, by itself, whether a handover process needs to be initiated.

After receiving the handover request message, the source core network node may route to the new core network node according to the identification information of the new wireless node and send a forward reallocation message to the new core network node, where the message carries the identity information of the terminal, Context information of the terminal, access layer information, indication information for the scenario, and the like.

After receiving the source core network node message, the new core network node sends a handover request message to the new wireless node.

The handover request message sent by the target core network node to the target wireless node includes information of an access stratum, identity information of a terminal, indication information directed to the scenario, and the like.

In some embodiments, after receiving the handover request from the source wireless node, the target wireless node sends a recovery message to the terminal after the relevant judgment is made, which may be: comparing the terminal identifier in the handover request message with the current terminal identifier for initiating the recovery request, and, if yes, issue the request.

In some embodiments, when the target wireless node receives the handover request of the source wireless node, and the handover confirmation message carries indication information for indicating the scenario of the new core network.

In some embodiments the source core network node receives a response message of the forward reallocation sent by the new core network node, instructing the source wireless node to release the context information of the terminal.

In some embodiments, the release context message may carry indication information for the scenario.

In some embodiments, the source wireless node can start a timer after it receives the release context information. In some embodiments, the source wireless node releases the terminal's context information after the timer expires.

Figure 9:
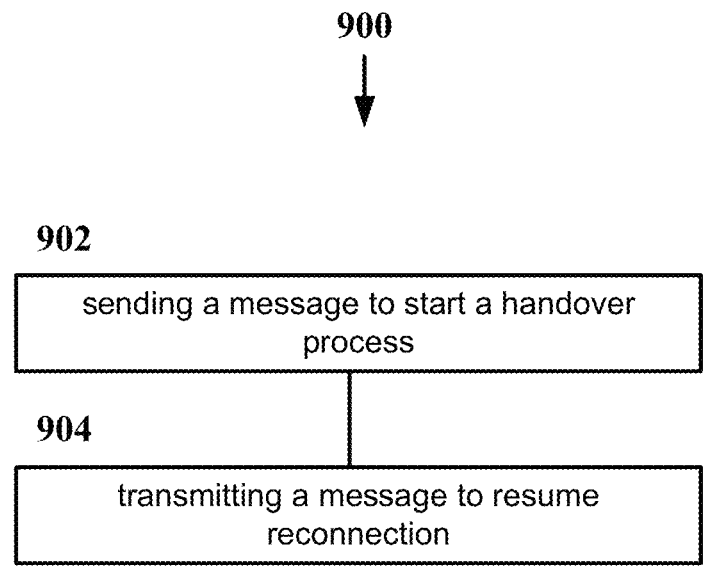
FIG. 9 is a flowchart of an example wireless communication method.

FIG. 9 is a flowchart of an example wireless communication method 900. The method 900 may be implemented by a gNB in a 5G network. The method 900 includes, at 902, sending, from a target wireless node to a source wireless node, a message to start a handover process, wherein the message includes an identification of a wireless device and an indication field. The method 900 includes, at 904, transmitting, upon receiving a handover request during the handover process, a message to the wireless device to resume reconnection. For example, with reference to FIG. 6, FIG. 7 and FIG. 8, the sending operation may be similar to the transmission of messages 603, 703 or 803. Furthermore, the transmitting operation performed in 904 may be similar to the 607, 709 or 807 messages described herein. For example, the handover process may be related to a wireless device that has moved in inactive state from RAN Area of a source wireless node to RAN area of a target wireless node.

The message to start the handover process may be implemented in response to receiving a connection request from the wireless device. For example, the wireless device may be coming out of its inactive state. As described with respect to Example embodiments 1-1, 1-2 and 2-1, both the cases of when the target wireless node and the source wireless node implement a same wireless protocol (e.g., 5G) or different wireless protocols (e.g., LTE and 5G) are possible. In some embodiments, the indication field may include a reason code about why the handover process was initiated. As described herein, in some cases, the reason may indicate that the wireless node does not have context information for the wireless device, or is not able to connect to the AMF in the source RAN Area of the wireless device. In various embodiments, the message to start the handover process may also identify the wireless device using a temporary identification such as C-RNTI, or UE ID of the device, or some other method that at least temporarily uniquely identifies the wireless device.

Figure 10:
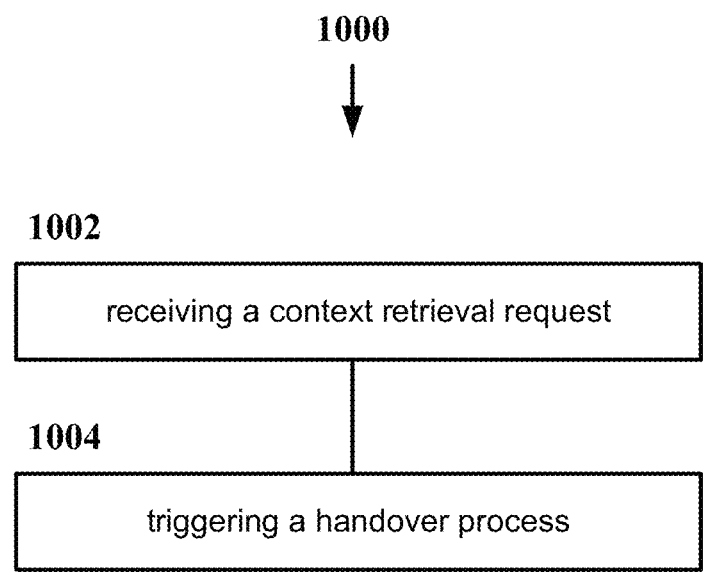
FIG. 10 is a flowchart of an example wireless communication method.

FIG. 10 is a flowchart of an example wireless communication method 1000. The method 1000 includes, at 1002, receiving, at a source wireless node, a context retrieval request including an indication from a target wireless node. The method 1000 includes, at 1004, triggering, in response to the indication, a handover process. For example, with reference to FIG. 6, FIG. 7 and FIG. 8, the context retrieval request may correspond to messages 603, 703 or 803. For example, the triggering of the handover process may be performed by transmitting the message 604, 706 or 804. As described in the present document, the handover process may include message exchanges between network elements such as source and target AMFs, eventually resulting in the context for the wireless device being received by the target wireless node.

Figure 11:
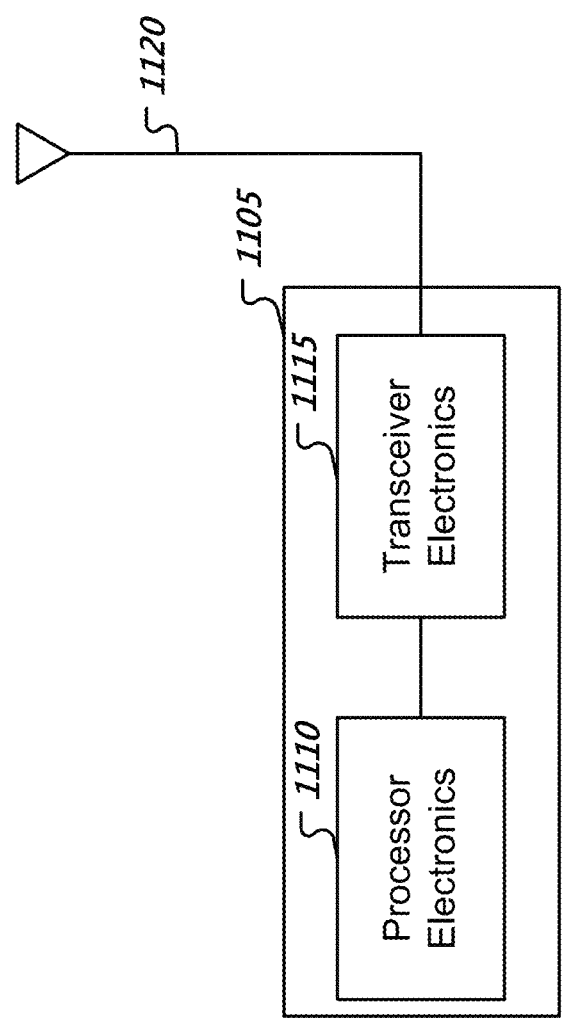
FIG. 11 is a block diagram example of a wireless communication apparatus.

FIG. 11 is a block diagram representation of a portion of a radio station. A radio station 1105 such as a base station or a wireless device (or UE) can include processor electronics 1110 such as a microprocessor that implements one or more of the wireless techniques presented in this document. The radio station 1105 can include transceiver electronics 1115 to send and/or receive wireless signals over one or more communication interfaces such as antenna 1120. The radio station 1105 can include other communication interfaces for transmitting and receiving data. Radio station 1105 can include one or more memories (not explicitly shown) configured to store information such as data and/or instructions. In some implementations, the processor electronics 1110 can include at least a portion of the transceiver electronics 1115. In some embodiments, at least some of the disclosed techniques, modules or functions are implemented using the radio station 1105.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for wireless communications, comprising:
   sending, from a target wireless node to a source wireless node, a message to start a handover process,
     wherein the message is sent in response to determining that the target wireless node cannot connect to a first core network node associated with the source wireless node,
     wherein the message includes an identification of a wireless device and an indication field, and
     wherein the handover process comprises the wireless device moving from a first area of the source wireless node to a second area of the target wireless node; and
   transmitting, by the target wireless node and upon receiving a handover request during the handover process, another message to the wireless device to resume reconnection,
     wherein the handover request is received from a second core network node associated with the target wireless node.

2. The method of claim 1, wherein the sending the message to start the handover process is implemented in response to receiving a connection request from the wireless device.

3. The method of claim 1, wherein the target wireless node and the source wireless node implement a same wireless protocol.

4. The method of claim 1, wherein the target wireless node and the source wireless node implement different wireless protocols.

5. The method of claim 4, wherein a first wireless protocol of the target wireless node adheres to a Fifth Generation (5G) standard and a second wireless protocol of the source wireless node adheres to a Long Term Evolution (LTE) standard.

6. The method of claim 1, wherein the identification of the wireless device includes one or more of a user equipment identification (UE ID) for the wireless device, a resume identification, and a temporary cell radio network temporary identifier (TC-RNTI).

7. The method of claim 1, wherein the wireless device is an inactive state.

8. The method of claim 1, wherein the indication field comprises a reason code for why the handover process is to be triggered.

9. An apparatus for wireless communication, comprising:
   a processor configured to:
     send, from a target wireless node to a source wireless node, a message to start a handover process,
       wherein the message is sent in response to a determination that the target wireless node cannot connect to a first core network node associated with the source wireless node,
       wherein the message includes an identification of a wireless device and an indication field, and
       wherein the handover process comprises the wireless device moving from a first area of the source wireless node to a second area of the target wireless node; and transmit, by the target wireless node and upon receiving a handover request during the handover process, another message to the wireless device to resume reconnection, wherein the handover request is received from a second core network node associated with the target wireless node.

10. The apparatus of claim 9, wherein the sending the message to start the handover process is implemented in response to receiving a connection request from the wireless device.

11. The apparatus of claim 10, wherein the wireless device is an inactive state.

12. The apparatus of claim 9, wherein the target wireless node and the source wireless node implement a same wireless protocol.

13. The apparatus of claim 9, wherein the target wireless node implements a first wireless protocol and the source wireless node implements a second wireless protocol different from the first wireless protocol.

14. The apparatus of claim 13, wherein the first wireless protocol adheres to a Fifth Generation (5G) standard and the second wireless protocol adheres to a Long Term Evolution (LTE) standard.

15. The apparatus of claim 9, wherein the indication field comprises a reason code for why the handover process is to be triggered.

16. The apparatus of claim 9, wherein the identification of the wireless device includes one or more of a user equipment identification (UE ID) for the wireless device, a resume identification, and a temporary cell radio network temporary identifier (TC-RNTI).

17. A non-transitory computer readable program storage medium having code stored thereon, the code, when executed by a processor, causing the processor to implement a method comprising:

sending, from a target wireless node to a source wireless node, a message to start a handover process,
wherein the message is sent in response to determining that the target wireless node cannot connect to a first core network node associated with the source wireless node,
wherein the message includes an identification of a wireless device and an indication field, and wherein the handover process comprises the wireless device moving from a first area of the source wireless node to a second area of the target wireless node; and transmitting, by the target wireless node and upon receiving a handover request during the handover process, another message to the wireless device to resume reconnection,
wherein the handover request is received from a second core network node associated with the target wireless node.

18. The non-transitory computer readable program storage medium of claim 17, wherein the sending the message to start the handover process is implemented in response to receiving a connection request from the wireless device.

19. The non-transitory computer readable program storage medium of claim 17, wherein the target wireless node and the source wireless node implement a same wireless protocol.

20. The non-transitory computer readable program storage medium of claim 17, wherein the target wireless node and the source wireless node implement different wireless protocols.

21. The non-transitory computer readable program storage medium of claim 20, wherein a first wireless protocol of the target wireless node adheres to a Fifth Generation (5G) standard and a second wireless protocol of the source wireless node adheres to a Long Term Evolution (LTE) standard.

22. The non-transitory computer readable program storage medium of claim 17, wherein the identification of the wireless device includes one or more of a user equipment identification (UE ID) for the wireless device, a resume identification, and a temporary cell radio network temporary identifier (TC-RNTI).

23. The non-transitory computer readable program storage medium of claim 17, wherein the wireless device is an inactive state.

24. The non-transitory computer readable program storage medium of claim 17, wherein the indication field comprises a reason code for why the handover process is to be triggered.

* * * * *